(12) United States Patent
Saito

(10) Patent No.: US 6,699,556 B2
(45) Date of Patent: Mar. 2, 2004

(54) OPTICAL INFORMATION RECORDING MEDIUM AND INFORMATION RECORDING METHOD

(75) Inventor: Naoki Saito, Kanagawa (JP)

(73) Assignee: Fuji Photo Film Co., Ltd., Kanagawa (JP)

( * ) Notice: Subject to any disclaimer, the term of this patent is extended or adjusted under 35 U.S.C. 154(b) by 0 days.

(21) Appl. No.: 09/962,251

(22) Filed: Sep. 26, 2001

(65) Prior Publication Data

US 2002/0061381 A1 May 23, 2002

(30) Foreign Application Priority Data

Sep. 27, 2000 (JP) .......................................... 2000-294241
Sep. 20, 2001 (JP) .......................................... 2001-286246

(51) Int. Cl.$^7$ ................................................. B32B 3/02
(52) U.S. Cl. ................. 428/64.1; 428/64.8; 430/270.14
(58) Field of Search .............................. 428/64.1, 64.4, 428/64.8, 913; 430/270.14, 270.15, 495.1, 945

(56) References Cited

U.S. PATENT DOCUMENTS 5,858,613 A    1/1999  Monden et al.

FOREIGN PATENT DOCUMENTS

WO    WO 96/38410 A1    12/1996
WO    WO 01/75873 A1    10/2001

OTHER PUBLICATIONS

Japanese Abstract No. 11171870, dated Jun. 29, 1999.
Japanese Abstract No. 2000163799, dated Jun. 16, 2000.

*Primary Examiner*—Elizabeth Mulvaney
(74) *Attorney, Agent, or Firm*—Sughrue Mion, PLLC

(57) ABSTRACT

An optical information recording medium having, on a substrate, a recording layer capable of recording information by irradiation with laser rays. The recording layer includes a 1,2,3-triazole compound that is not a condensate with 1,3-dimethylbarbituric acid. Also, an information recording method in which such an optical information recording medium is irradiated with a laser having a wavelength of 550 nm or less to record information.

18 Claims, No Drawings

OPTICAL INFORMATION RECORDING MEDIUM AND INFORMATION RECORDING METHOD

BACKGROUND OF THE INVENTION

1. Field of the Invention

The present invention relates to an optical information recording medium and an information recording method and in particular to an optical information recording medium and an information recording method capable of recording and reproducing information by irradiation with laser rays. In particular, the present invention relates to an optical information recording medium suitable for recording information by irradiation with short-wavelength laser rays having wavelengths of 550 nm or less and an information recording method using this optical information recording medium.

2. Description of the Related Art

Heretofore, an optical information recording medium (optical disk) capable of recording information only once by laser rays has been known. This optical disk is also called addition writing-type CD (so-called CD-R), and this disk is structured typically by laminating a recording layer containing an organic colorant, a light-reflective layer consisting of a metal such as gold, and a protective layer made of resin in this order on a transparent disk-shaped substrate. Recording of information on this CD-R is conducted by irradiating the CD-R with near-infrared laser rays (usually laser rays with wavelengths in the vicinity of 780 nm), and the portion thus irradiated absorbs the rays to increase temperature locally thus undergoing a physical or chemical change (e.g., formation of pits) thereby changing the optical characteristics at that portion to record information. Reading (reproduction) of information is conducted by irradiating the CD-R with laser rays having the same wavelength as that of the recording laser rays and detecting a difference in reflectance between a portion where the optical characteristics of the recording layer were changed (recorded portion) and a portion where the characteristics were not changed (unrecorded portion).

Further, an optical disk called an addition writing-type digital versatile disk (so-called DVD-R) has been proposed and practically used as an optical information recording medium capable of higher density recording than CD-R. Usually, a DVD-R has either: a structure in which two disks each consisting of a recording layer containing an organic pigment, a light-reflective layer and a protective layer laminated in this order on a transparent disk-shaped substrate are laminated with their recording layers inside; or a structure in which said disk and a disk-shaped protective substrate of the same shape as said disk are laminated with the recording layer inside. On the transparent disk-shaped substrate, a guide groove (pre-groove) for tracking irradiation laser rays is formed with a groove width (0.74 to 0.8 $\mu$m) which is less than half the width of grooves on a CD-R. Recording and reproduction of information on the DVD-R is performed by irradiation of visible laser rays (usually, laser rays having wavelengths in the range of 630 nm to 680 nm) to achieve higher density recording than CD-Rs.

Recently, high-vision TV, networks such as the Internet and the like have been rapidly spreading. Further, the start of broadcasting of HDTV (high definition television) is near at hand. Under these circumstances, there is a strong demand for a high-capacity recording medium capable of recording image information easily and inexpensively. At present, DVD-R fulfills a satisfactory role as a high-capacity recording medium, but there is an increasing demand for higher capacity and higher density, and development of a recording medium for coping with such demand is also necessary. Accordingly, a recording medium of higher capacity capable of high-density recording with rays of shorter wavelengths than those for DVD-R is being developed.

For example, Japanese Patent Application Laid Open (JP-A) No. 4-74690, JP-A 8-127174, JP-A 11-53758, JP-11-334204, JP-A 11-334205, JP-A 11-334206, JP-A 11-334207, JP-A 2000-43424, JP-A 2000-108513, JP-A 2000-113504, JP-A 2000-149320 and JP-A 2000-158818 disclose a recording and reproduction method wherein an optical information recording medium having a recording layer containing an organic dye is irradiated with a laser having a wavelength of 530 nm or less in a direction from the recording layer toward the light-reflective layer, thus effecting recording and reproduction of information. In this method, an optical disk equipped with a recording layer containing a porphyrin compound, an azo type dye, a metal azo type dye, a quinophthalone type dye, a trimethine cyanine dye, a dicyanovinyl phenyl skeleton dye, a coumarin compound or the like is irradiated with a lasers of blue color (wavelengths of 430 nm and 488 nm) or bluish-green color (wavelength of 515 nm), thereby effecting the recording and reproduction of information.

However, investigations by the inventors of the present invention have revealed that the optical disks described in the above publications cannot achieve practically required sensitivity in the case of recording information by irradiation with short-wavelength laser rays, with wavelengths of 550 nm or less, and other recording characteristics such as reflectance and degree of modulation are not satisfactory, thus necessitating further improvements. In particular, the optical disks described in the above publications have lower recording characteristics when irradiated with laser rays having wavelengths of 450 nm or less.

SUMMARY OF THE INVENTION

The present invention was made in view of the problems in the prior art described above, and a first object of the present invention is to provide an optical information recording medium excellent in recording characteristics and capable of recording and reproducing information by irradiation with laser rays having wavelengths of 550 nm or less, particularly laser rays having wavelengths of 450 nm or less, which are shorter than wavelengths of laser rays used in recording and reproducing information on CD-R and DVD-R. A second object of the present invention is to provide an information recording method capable of high-density recording of information by irradiation with laser rays having wavelengths of 550 nm or less, particularly laser rays having wavelengths of 450 nm or less, which are shorter than wavelengths of laser rays used in recording and reproduction on CD-R and DVD-R. A first aspect of the present invention is directed to an optical information recording medium having: a substrate; and a recording layer on the substrate which is capable of recording information by irradiation with laser rays, the recording layer comprising a 1,2,3-triazole compound devoid of a condensate with 1,3-dimethylbarbituric acid. The second aspect of the present invention is directed to an information recording method including steps of: providing an optical information recording medium having, on a substrate, a recording layer capable of recording information by irradiation with laser rays, the recording layer comprising a 1,2,3-triazole compound devoid of a condensate with 1,3-dimethylbarbituric acid; and irradiating the optical information recording medium with a laser having a wavelength of at most 550 nm for recording information.

According to the present inventors' studies, an optical information recording medium having a recording layer on a substrate, which has good recording characteristics in having high sensitivity, high reflectance and high degrees of modulation even with respect to short-wavelength laser rays having wavelengths of 550 nm or less, and particularly wavelengths of 450 nm or less, can be obtained by inclusion of a 1,2,3-triazole compound in the recording layer, which is capable of recording information by irradiation with laser lays. Further, this optical information recording medium is capable of high-density recording of information by irradiation with laser rays having wavelengths of 550 nm or less, and particularly wavelengths of 450 nm or less.

DESCRIPTION OF THE PREFERRED EMBODIMENTS

Below, the embodiments of the optical information recording medium and the information recording method according to the present invention are described in detail.

The optical information recording medium of the present invention is a medium having, on a substrate, a recording layer capable of recording information by irradiation with laser rays. The recording layer contains a 1,2,3-triazole compound (not a condensate with 1,3-dimethylbarbituric acid). Condensates with 1,3-dimethylbarbituric acid are excluded because condensates with 1,3-dimethylbarbituric acid have a problem of easy crystallization, such that upon application for forming a recording layer, the recording layer tends to be made opaque.

The 1,2,3-triazole compound used in the optical information recording medium of the present invention is preferably a compound represented by the following general formula (I):

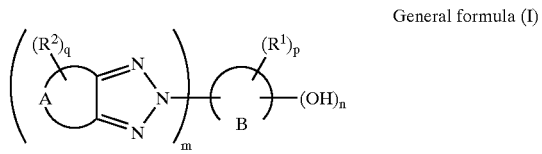

General formula (I)

in which: A and B represent optionally substituted aromatic rings; m and n each independently represents an integer from 1 to 3; $R^1$ and $R^2$ represent substituents (the substituent represented by $R^1$ is not derived from 1,3-dimethylbarbituric acid); and p and q represent integers from 0 to 3.

The 1,2,3-triazole compounds represented by the general formula (I) are compounds wherein the aromatic ring represented by B is substituted at least with a hydroxyl group and a nitrogen atom at the 2-position in a 1,2,3-triazolyl group, and the aromatic group represented by A forms a fused ring with the 1,2,3-triazole ring.

In the general formula (I), m is a number of 1,2,3-triazolyl groups. m is an integer from 1 to 3, preferably 1 or 2, and particularly preferably 2. n is a number of hydroxyl groups. n is an integer from 1 to 3, and preferably equals to m.

In the general formula (I), examples of the optionally substituted aromatic rings represented by A and B include hydrocarbon aromatic rings such as a benzene ring, naphthalene ring, anthracene ring and phenanthrene ring and heterocyclic aromatic rings such as a pyridine ring, pyrimidine ring, quinoline ring, furan ring, pyrrole ring and pyrazol ring, among which the benzene ring, naphthalene ring and pyridine ring are preferable, and the benzene ring is particularly preferable.

In the general formula (I), $R^1$ is a substituent on the aromatic ring represented by B, and $R^2$ is a substituent on the aromatic ring represented by A. p is a number of substituent $R^1$ groups. p is an integer from 0 to 3, preferably 1 or 2, and particularly preferably 1. q is a number of substituent $R^2$ groups. q is an integer from 0 to 3, preferably 1 or 2, and particularly preferably 1.

In the general formula (I), examples of the substituents represented by $R^1$ and $R^2$ include a $C_{1-20}$ linear or cyclic alkyl group (e.g., methyl, ethyl, isopropyl, or cyclohexyl), a $C_{6-18}$ aryl group (e.g., phenyl or chlorophenyl, 2,4-di-t-aminophenyl, or 1-naphthyl), a $C_{7-19}$ aralkyl group (e.g., benzyl or anisyl), a $C_{2-20}$ alkenyl group (e.g., vinyl or 2-methylvinyl), a $C_{2-20}$ alkynyl group (e.g., ethynyl, 2-methylethynyl, or 2-phenylethynyl), a halogen atom (e.g., F, Cl, Br, or I), a cyano group, a hydroxyl group, a carboxyl group, a $C_{2-20}$ acyl group (e.g., acetyl, benzoyl, salicyloyl, or pivaloyl), a $C_{1-20}$ alkoxy group (e.g., methoxy, butoxy, or cyclohexyloxy), a $C_{6-20}$ aryloxy group (e.g., phenoxy, 1-naphthoxy, or toluoyl), a $C_{1-20}$ alkylthio group (e.g., methylthio, butylthio, benzylthio, or 3-methoxypropylthio), a $C_{6-20}$ arylthio group (e.g., phenylthio or 4-chlorophenylthio), a $C_{1-20}$ alkylsulfonyl group (e.g., methane sulfonyl or butane sulfonyl), a $C_{6-20}$ arylsulfonyl group (e.g., benzene sulfonyl or p-toluene sulfonyl), a $C_{1-17}$ carbamoyl group (e.g., unsubstituted carbamoyl, methyl carbamoyl, ethyl carbamoyl, n-butyl carbamoyl, or dimethyl carbamoyl), a $C_{0-16}$ sulfamoyl group (e.g., unsubstituted sulfamoyl, N,N-dipropylsulfamoyl, N-methylsulfamoyl, N-phenylsulfamoyl), a $C_{1-16}$ amide group (e.g., acetamide or benzamide), a $C_{2-20}$ acyloxy group (e.g., acetoxy or benzoyloxy), a $C_{2-20}$ alkoxycarbonyl group (e.g., methoxycarbonyl or ethoxycarbonyl), a 5- or 6-membered heterocyclic group (e.g., an aromatic heterocyclic ring such as pyridyl, thienyl, furyl, thiazolyl, imidazolyl or pyrazolyl, or a heterocyclic ring such as a pyrrolidine ring, piperidine ring, morpholine ring, pyran ring, thiopyran ring, dioxane ring or dithiolan ring). However, groups derived from 1,3-dimethylbarbituric acid are excluded from the substituent represented by $R^1$.

The substituent represented by $R^1$ is preferably a $C_{2-16}$ linear or cyclic alkyl group, a $C_{6-14}$ aryl group, a $C_{7-15}$ aralkyl group, a $C_{1-16}$ alkoxy group, a $C_{6-14}$ aryloxy group, a $C_{2-21}$ acyloxy group, a $C_{2-16}$ acyl group, a halogen atom, a $C_{2-17}$ alkoxycarbonyl group, a $C_{1-10}$ carbamoyl group or a $C_{1-10}$ amide group, more preferably a $C_{2-10}$ linear or cyclic alkyl group, a $C_{7-13}$ aralkyl group, a $C_{6-10}$ aryl group, a $C_{2-10}$ alkoxy group, a $C_{2-17}$ acyloxy group, a $C_{6-10}$ aryloxy group, a chlorine atom, a $C_{2-11}$ alkoxycarbonyl group, a $C_{2-7}$ carbamoyl group or a $C_{2-8}$ amide group, and particularly preferably a $C_{3-10}$ linear branched or cyclic alkyl group, a $C_{7-11}$ aralkyl group, a $C_{2-8}$ alkoxy group, a $C_{2-11}$ acyl group, a $C_{3-9}$ alkoxycarbonyl group, phenyl or a chlorine atom.

The substituent represented by $R^2$ is preferably a $C_{1-16}$ linear or cyclic alkyl group, a $C_{6-14}$ aryl group, a $C_{7-15}$ aralkyl group, a $C_{1-16}$ alkoxy group, a $C_{6-14}$ aryloxy group, a $C_{2-21}$ acyloxy group, a $C_{1-16}$ alkylthio group, a $C_{6-14}$ arylthio group, a halogen atom, a $C_{2-16}$ acyl group, a $C_{2-17}$ alkoxycarbonyl group, a $C_{1-10}$ carbamoyl group or a $C_{1-10}$ amide group, more preferably a $C_{1-10}$ alkoxy group, a $C_{6-10}$ aryloxy group, a $C_{1-10}$ alkylthio group, a $C_{6-10}$ arylthio group, a chlorine atom, a $C_{2-11}$ alkoxycarbonyl group, a $C_{1-7}$ carbamoyl group, or a $C_{1-8}$ amide group, and particularly preferably a $C_{1-8}$ alkoxy group, a $C_{1-8}$ alkylthio group, a $C_{6-10}$ arylthio group, a $C_{3-9}$ alkoxycarbonyl group, or a chlorine atom.

However, if m=1 and p≠0, the substituent represented by $R^1$ is particularly preferably a $C_{2-16}$ alkyl group, a $C_{6-14}$ aryl group, a $C_{7-15}$ aralkyl group, a $C_{1-16}$ alkoxy group, a $C_{6-14}$ aryloxy group, a $C_{2-17}$ alkoxycarbonyl group, a $C_{1-10}$ carbamoyl group, a $C_{1-10}$ amide group, a $C_{2-17}$ acyloxy group, a $C_{2-16}$ acyl group, or a halogen atom.

A substituent represented by $R^1$ or $R^2$ may have a further substituent, and examples of the further substituent in this case include those enumerated above as substituents represented by $R^1$ or $R^2$. Further, $R^1$ may be a divalent or trivalent linking group, with which a plurality of the aromatic ring B may be substituted. In this case, the aromatic rings B substituted with $R^1$ may be the same as each other or different.

Among the compounds represented by the general formula (I) above, the 1,2,3-triazole compounds represented by the following general formula (I-A) are more preferable.

General formula (I-A)

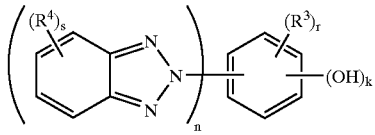

in which: h and k each independently represents an integer from 1 to 3; $R^3$ and $R^4$ represent substituents; and r and s represent integers from 0 to 3. If h=1 and r≠0, $R^3$ represents a substituent selected from a group consisting of a $C_{2-16}$ alkyl group, a $C_{6-14}$ aryl group, a $C_{7-15}$ aralkyl group, a $C_{1-16}$ alkoxy group, a $C_{6-14}$ aryloxy group, a $C_{2-20}$ acyl group, a $C_{2-17}$ alkoxycarbonyl group, a $C_{1-10}$ carbamoyl group, a $C_{1-10}$ amide group, a $C_{2-17}$ acyloxy group, and a halogen atom.

The 1,2,3-triazole compounds represented by the general formula (I-A) are compounds whose benzene ring has been substituted at least with a hydroxyl group and the nitrogen atom at the 2-position in a 1,2,3-benzotriazolyl group.

In the general formula (I-A), h is a number of 1,2,3-benzotriazolyl groups. h is an integer from 1 to 3, preferably 1 or 2, and particularly preferably 2. k is a number of hydroxyl groups. k is an integer from 1 to 3, and preferably equals to h. Preferably, a 1,2,3-benzotriazolyl group and hydroxyl group with which the benzene ring is substituted are adjacent to each other.

In the general formula (I-A), $R^3$ is a substituent on the benzene ring, and $R^4$ is a substituent on the 1,2,3-benzotriazole ring. r is a number of substituent $R^3$ groups. r is an integer from 0 to 3, preferably 1 or 2, and particularly preferably 1. s is a number of substituent $R^4$ groups. s is an integer from 0 to 3, preferably 1 or 2, and particularly preferably 1.

In the general formula (I-A), examples of the substituents represented by $R^3$ and $R^4$ include those enumerated above as substituents respectively represented by $R^1$ and $R^2$ in the general formula (I). This also applies to substituent preferences.

However, if h=1 and r≠0, the substituent represented by $R^3$ is particularly preferably a $C_{2-16}$ alkyl group, a $C_{6-14}$ aryl group, a $C_{7-15}$ aralkyl group, a $C_{1-16}$ alkoxy group, a $C_{6-14}$ aryloxy group, a $C_{2-17}$ alkoxycarbonyl group, a $C_{1-10}$ carbamoyl group, a $C_{1-10}$ amide group, a $C_{2-17}$ acyloxy group, a $C_{2-16}$ acyl group, or a halogen atom.

A substituent represented by $R^3$ or $R^4$ may have a further substituent, and examples of the further substituent in this case include those enumerated above as substituents represented by $R^1$ or $R^2$. Further, $R^3$ may be a divalent or trivalent linking group, with which a plurality of benzene rings may be substituted. In this case, the plurality of benzene rings substituted with $R^3$ may be substituted with different substituents from each other.

Among the compounds represented by the general formula (I-A) above, the 1,2,3-triazole compounds represented by the following general formula (I-B) are particularly preferable.

General formula (I-B)

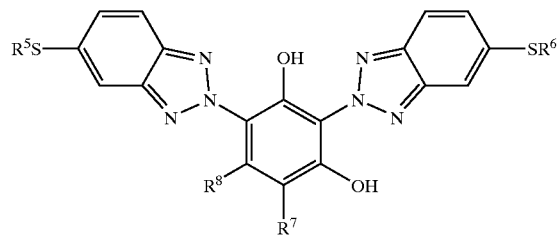

in which: $R^5$ and $R^6$ each independently represents a substituent selected from a group consisting of a $C_{1-20}$ linear or cyclic alkyl group, a $C_{6-8}$ aryl group, a $C_{7-19}$ aralkyl group, and a 5- or 6-memberd heterocyclic group; $R^7$ represents a substituent selected from a group consisting of a hydrogen atom, a halogen atom, a $C_{1-20}$ linear or cyclic alkyl group, a $C_{6-18}$ aryl group, a $C_{7-19}$ aralkyl group, a $C_{2-20}$ acyl group, a $C_{1-20}$ alkoxy group, a $C_{2-20}$ alkoxycarbonyl group, and a $C_{1-17}$ carbamoyl group; and $R^8$ represents a substituent selected from a group consisting of a hydrogen atom, a halogen atom, a hydroxyl group, a $C_{1-20}$ alkoxy group, and a $C_{2-20}$ acyloxy group. Each substituent represented by $R^7$ and $R^8$ may be linked together to form a ring.

In the general formula (I-B), the substituent represented by $R^5$ and $R^6$ each independently is preferably a $C_{1-16}$ linear or cyclic alkyl group, or a $C_{6-14}$ aryl group, more preferably a $C_{1-10}$ linear alkyl group or phenyl group.

In the general formula (I-B), the substituent represented by $R^7$ is preferably a hydrogen atom, a $C_{1-16}$ linear alkyl group, a $C_{2-11}$ acyl group, a $C_{1-16}$ alkoxy group, a $C_{2-11}$ alkoxycarbonyl group, or a $C_{1-10}$ carbamoyl group, more preferably a $C_{2-11}$ acyl group, a $C_{1-16}$ alkoxy group, or a $C_{2-11}$ alkoxycarbonyl group.

In the general formula (I-B), the substituent represented by $R^8$ is preferably a hydrogen atom, a hydroxyl group, or a $C_{1-16}$ alkoxy group, more preferably a hydrogen atom or a hydroxyl group.

In the general formula (I-B), a substituent represented by $R^5$, $R^6$, $R^7$ or $R^8$ may have a further substituent, and examples of the further substituent in this case include those enumerated above as substituents represented by $R^1$ or $R^2$ in the general formula (I).

Compounds represented by the general formula (I), (I-A) or (I-B) may be bound to one another directly or indirectly at arbitrary positions to form a multimer, and the respective units in this case may be the same as each other or different. When the units are bound to one another directly or indirectly at an arbitrary position to form a multimer, they may be bound via a substituent represented by $R^1$ or $R^3$, serving as a linking group. Further, they may be bound to a polymer chain such as polystyrene, polymethacrylate, polyvinyl alcohol, cellulose or the like.

Below, preferable examples of the 1,2,3-triazole compounds used in the present invention are enumerated, but these are not intended to limit the present invention.

(1)
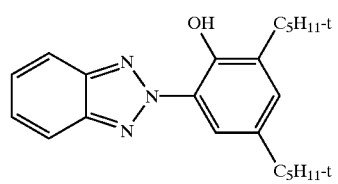
(2)
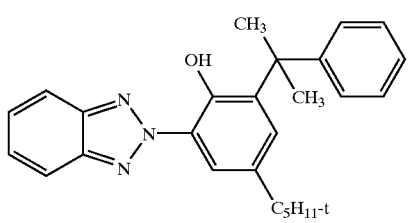
(3)
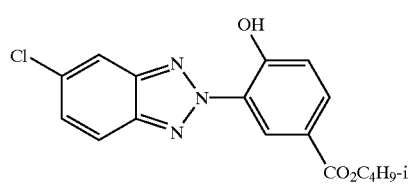
(4)
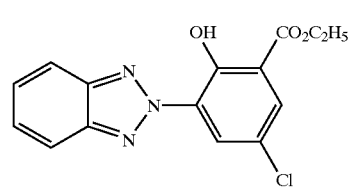
(5)
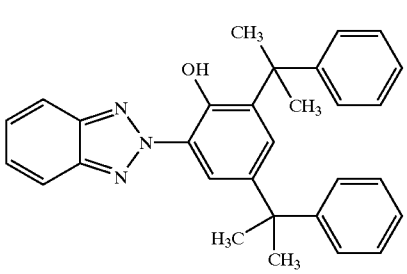
(6)
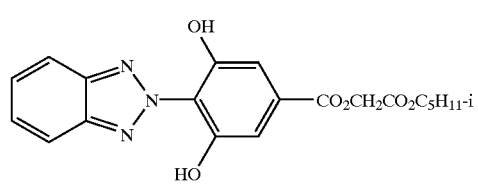
(7)
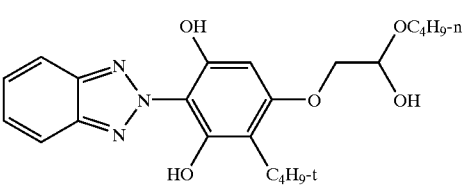
(8)
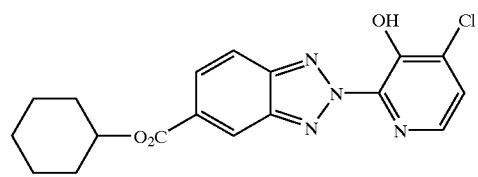
(9)
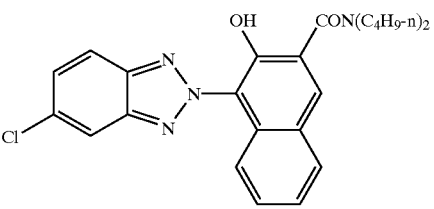
(10)
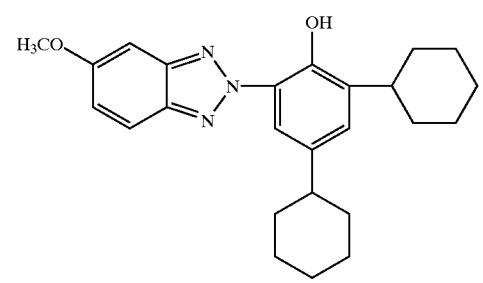
(11)
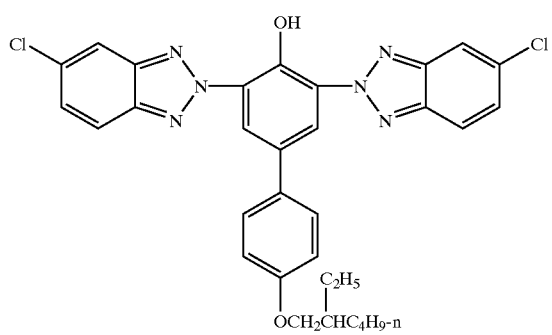
(12)
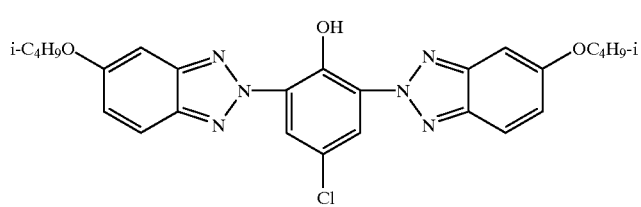
(13)

-continued
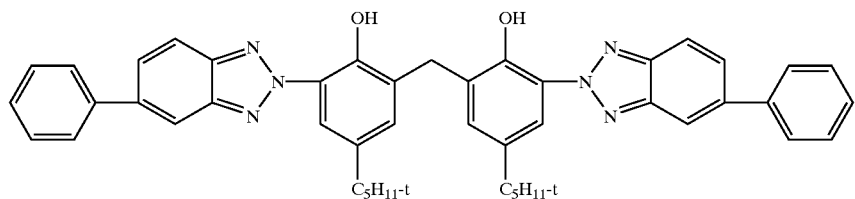
(14)
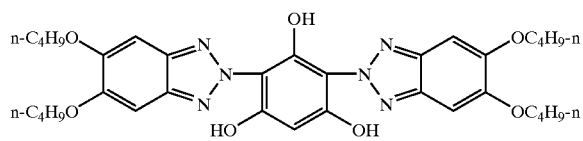
(15)
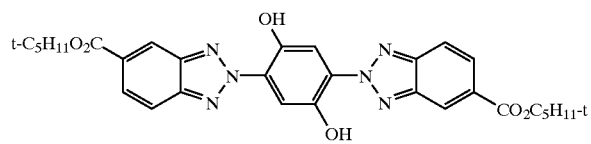
(16)
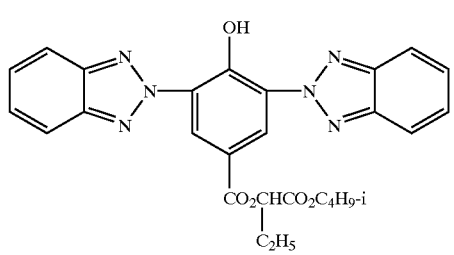
(17)
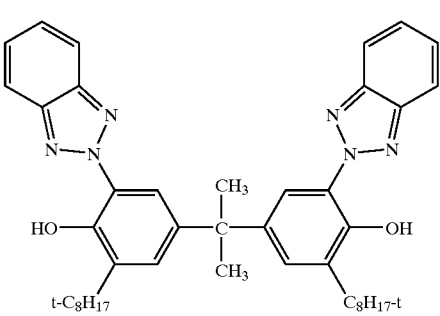
(18)
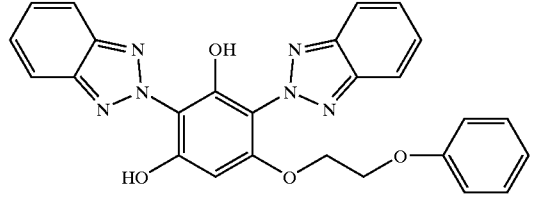
(19)
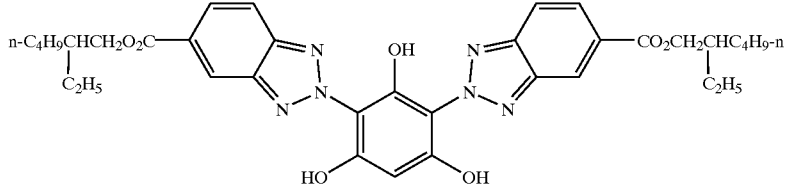
(20)
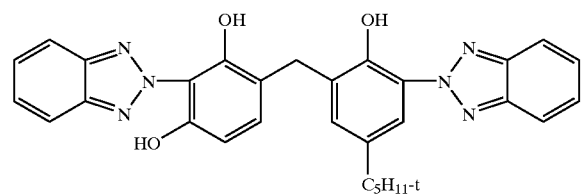
(21)
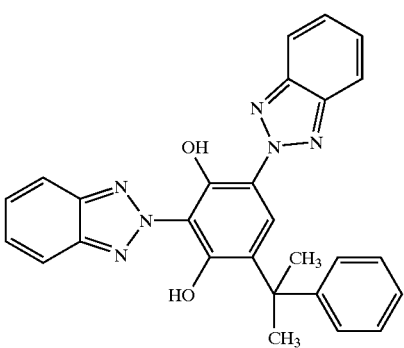
(22)

-continued
(23)
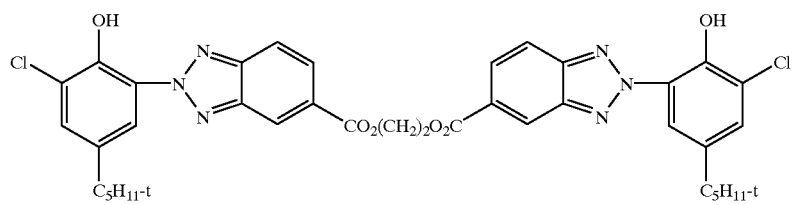
(24)
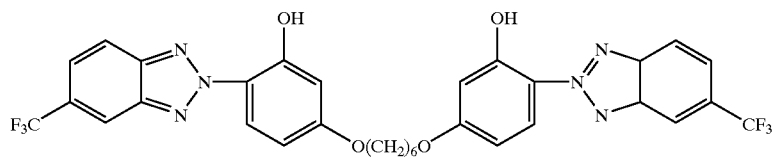
(25)
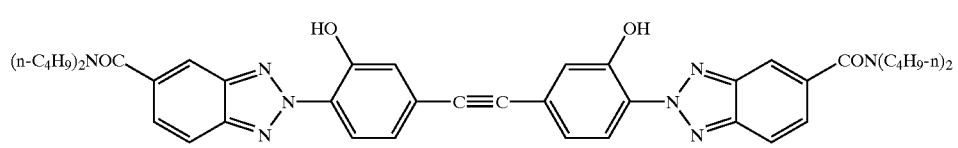
(26)
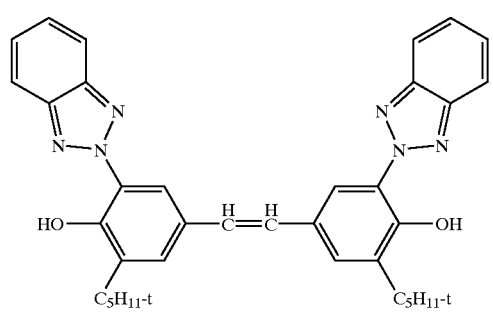
(27)
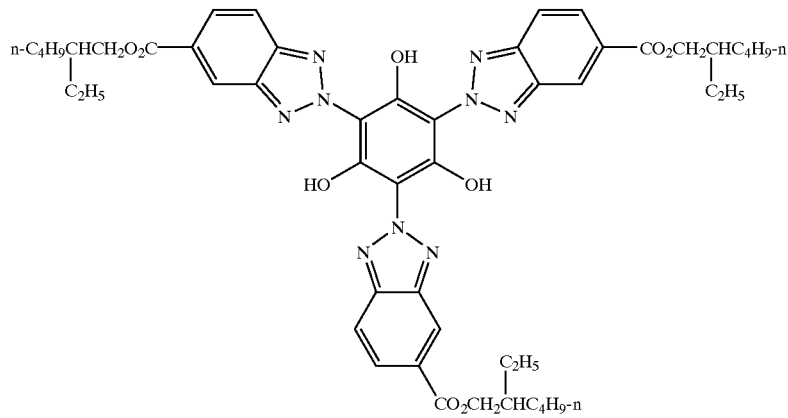
(28)
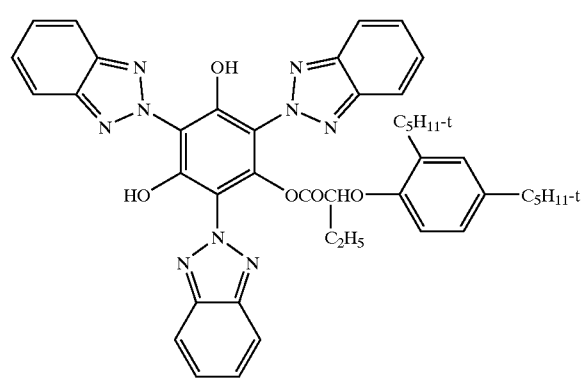
(29)
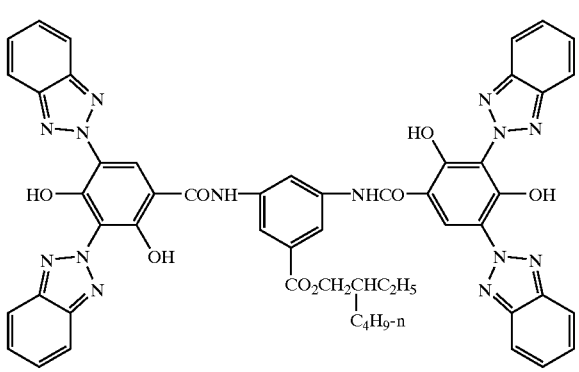

-continued
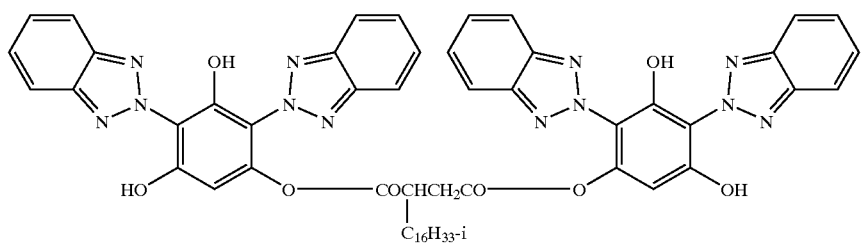
(30)
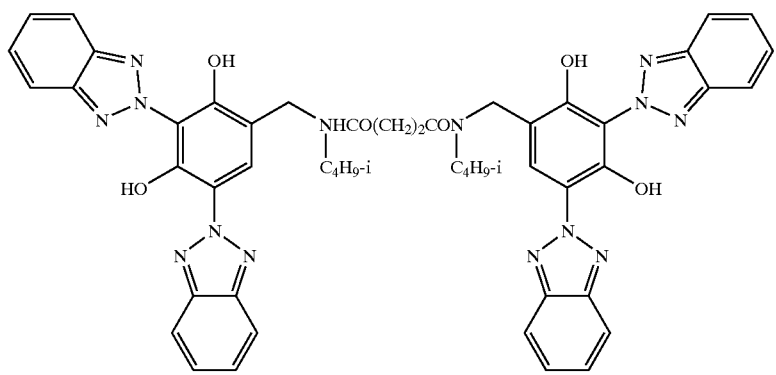
(31)
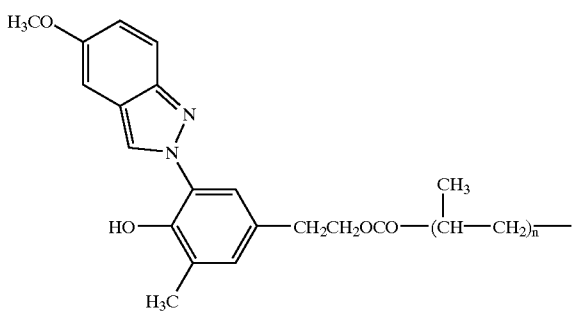
(32)
(Average molecular weight: 8600)
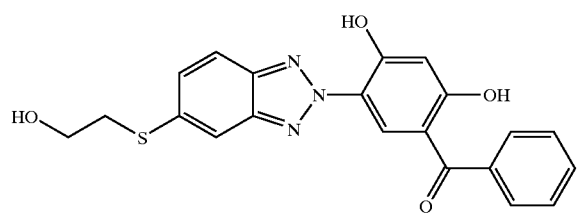
(33)
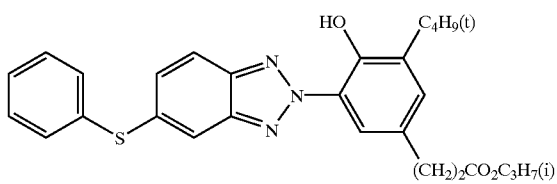
(34)
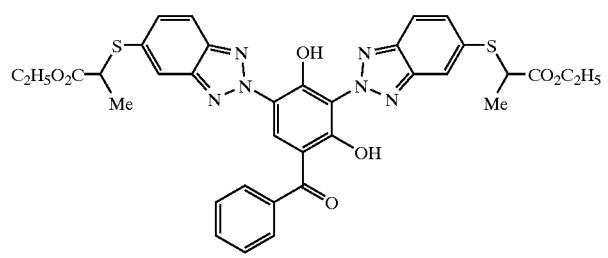
(35)
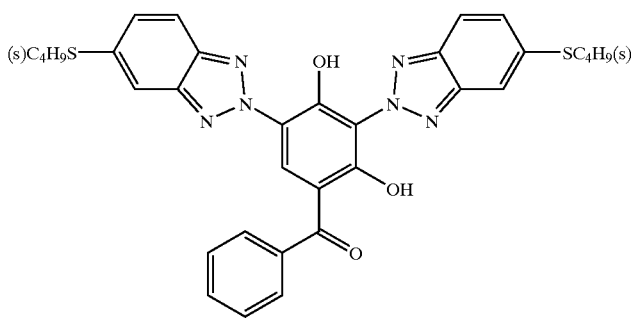
(36)

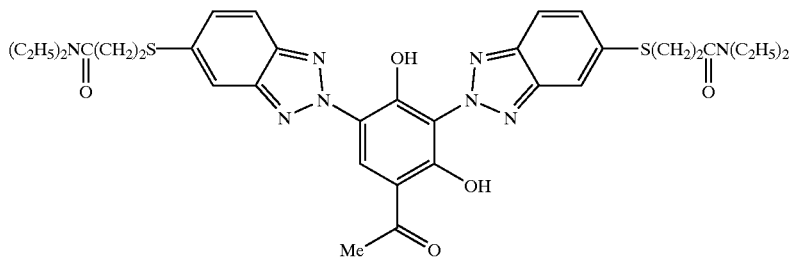
(37)

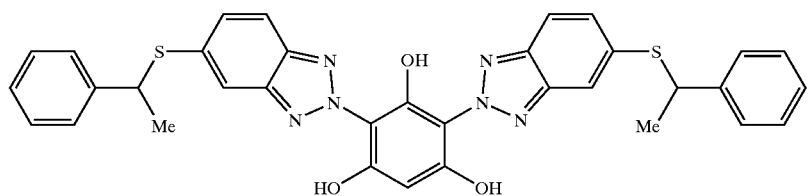
(38)

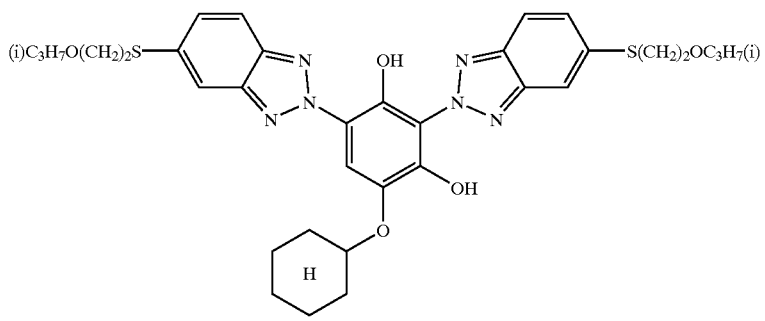
(39)

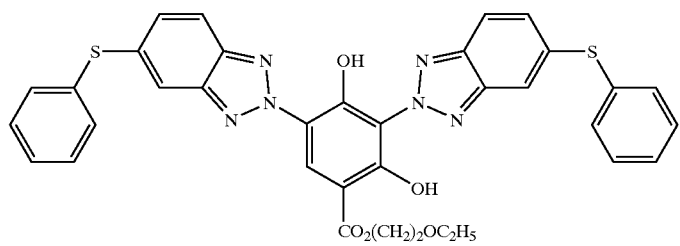
(40)

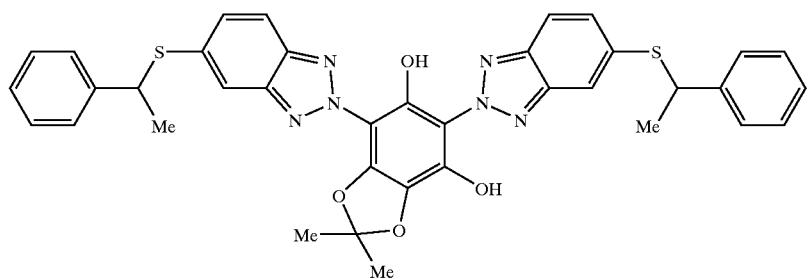
(41)

The 1,2,3-triazole compounds used in the present invention can be synthesized by methods described or cited in, for example, Japanese Patent Application Publication (JP-B) No. 54-41038, JP-B 60-14062, JP-B 2-33709, Japanese Patent Nos. 2,858,940 and 2,864,468, British Patent No. 1,239,258, U.S. Pat. No. 4,587,346, *Polymer*, Vol. 26, p. 1288 (1985), *Monatsh. Chem.* 112, 1279 (1981), and the like (or by analogous methods). 1,2,3-triazole compounds commercially available as coatings or polymer stabilizers may also be used.

The 1,2,3-triazole compounds may be used singly or in combination. Further, a 1,2,3-triazole compound may be used in combination with another coloring compound serving as a recording material. Coloring compounds which can be used in such combination include, for example, cyanine type dyes, oxonol type dyes, azo metal complexes, phthalocyanine type dyes, pyrylium type dyes, thiopyrylium type dyes, azulenium type dyes, squarylium type dyes, naphthoquinone type dyes, triphenyl methane type dyes, and triaryl methane dyes.

The optical information recording medium of the present invention is not particularly limited insofar as it has a recording layer containing a 1,2,3-triazole compound on a substrate, and the present medium can be applied in optical information recording media of various structures. The optical information recording medium of the present invention can be constituted such that, for example, a recording layer, a light-reflective layer and a protective layer are arranged in this order on a disk-shaped substrate having a pre-groove formed thereon with a predetermined track pitch. Hereinafter, a structure of an optical information recording medium is described in detail by reference to a process of manufacturing an optical information recording medium having a recording layer, a light-reflective layer and a protective layer in this order on a disk-shaped substrate.

The substrate for the optical information recording medium of the present invention can be freely selected from a wide variety of materials used as substrates for conventional optical information recording media. Examples of the substrate material include glass, polycarbonate, acrylic resins such as polymethyl methacrylate, vinyl chloride-based resins such as polyvinyl chloride and vinyl chloride copolymers, epoxy resins, amorphous polyolefins and polyester. As necessary, these materials may be used in combination. These materials can be used as films or rigid substrates. Among the above materials, polycarbonate is preferable from the viewpoint of moisture resistance, dimensional stability and price.

The optical information recording medium of the present invention preferably uses a substrate having a pre-groove formed thereon with a track pitch which is narrower than for a CD-R or DVD-R, to achieve a higher recording density. For the optical information recording medium of the present invention, the track pitch is preferably in the range of 0.2 to 0.8 $\mu$m, more preferably 0.25 to 0.50 $\mu$m and further preferably 0.30 to 0.35 $\mu$m. The depth of the pre-groove is preferably in the range of 0.020 to 0.18 $\mu$m, more preferably 0.025 to 0.075 $\mu$m and particularly preferably 0.025 to 0.045 $\mu$m.

For the purpose of improving flatness, improving adhesion and preventing deterioration of the recording layer, the surface of the substrate on which the recording layer is to be arranged may be provided with an undercoat layer. Example materials of the undercoat layer include polymeric materials such as polymethyl methacrylate, acrylic acid-methacrylic acid copolymers, styrene-maleic anhydride copolymers, polyvinyl alcohols, N-methylol acrylamide, styrene-vinyl toluene copolymers, chlorosulfonated polyethylene, nitrocellulose, polyvinyl chloride, chlorinated polyolefin, polyester, polyimide, vinyl acetate-vinyl chloride copolymers, ethylene-vinyl acetate copolymers, polyethylene, polypropylene and polycarbonate, as well as surface modifiers such as silane coupling agents. The undercoat layer can be formed by dissolving or dispersing the above material in a suitable solvent to prepare a coating solution and then applying this coating solution onto the surface of the substrate by a coating method such as spin coating, dip coating or extrusion coating. The thickness of the undercoat layer is generally in the range of 0.005 to 20 $\mu$m, and preferably in the range of 0.01 to 10 $\mu$m.

The recording layer can be formed by dissolving the 1,2,3-triazole compound and additives such as a binder in a solvent to prepare a coating solution, applying this coating solution onto the surface of the substrate to form a coating thereon, and then drying.

Examples of the solvent for use in the coating solution include esters such as butyl acetate, ethyl lactate and cellosolve acetate; ketones such as, methyl ethyl ketone, cyclohexanone and methyl isobutyl ketone; chlorinated hydrocarbons such as dichloromethane, 1,2-dichloroethane and chloroform; amides such as dimethyl formamide; hydrocarbons such as methyl cyclohexane; ethers such as tetrahydrofuran, ethyl ether and dioxane; alcohols such as ethanol, n-propanol, isopropanol and n-butanol diacetone alcohol; fluorine type solvents such as 2,2,3,3-tetrafluoropropanol; and glycol ethers such as ethylene glycol monomethyl ether, ethylene glycol monoethyl ether and propylene glycol monomethyl ether. These solvents can be used singly or in combination, in consideration of solubility of a dye to be used. Depending on objectives, various additives such as antioxidants, UV absorbers, plasticizers, lubricants and the like may further be added to the coating solution.

In the case where a binder is used, examples of the binder include natural organic polymers such as gelatin, cellulose derivatives, dextran, rosin and rubber, and synthetic organic polymers such as initial condensates of thermosetting resins, including: hydrocarbon type resins such as polyethylene, polypropylene, polystyrene and polyisobutylene; vinyl type resins such as polyvinyl chloride, polyvinylidene chloride, and polyvinyl chloride-polyvinyl acetate copolymers; acrylic resins such as methyl polyacrylate and methyl polymethacrylate; polyvinyl alcohol; chlorinated polyethylene; epoxy resins; butyral resins; rubber derivatives; phenol-formaldehyde resins and the like. If the binder is used in combination as a material in the recording layer, the amount of the binder used is generally in the range of 0.01 to 50 parts per part of the dye (ratio by weight), and preferably in the range of 0.1 to 5 parts (ratio by weight). The concentration of the dye in the coating solution thus prepared is generally in the range of 0.01 to 10% by weight, and preferably 0.1 to 5% by weight.

The coating method includes spraying, spin-coating, dipping, roll coating, blade coating, doctor rolling, screen printing, etc. The recording layer may be a single layer or multiple layers. The thickness of the recording layer is generally in the range of 20 to 500 nm, preferably in the range of 30 to 300 nm and more preferably in the range of 50 to 100 nm.

To improve the light resistance of the recording layer, the recording layer can contain various discoloration inhibitors. As the discoloration inhibitor, a singlet oxygen quencher is generally used. The singlet oxygen quencher may be one described in literature such as prior patent specifications and the like. Examples thereof include those described in JP-A 58-175693, JP-A 59-81194, JP-A 60-18387, JP-A 60-19586, JP-A 60-19587, JP-A 60-35054, JP-A 60-36190, JP-A 60-36191, JP-A 60-44554, JP-A 60-44555, JP-A 60-44389, JP-A 60-44390, JP-A 60-54892, JP-A 60-47069, JP-A 63-209995, JP-A 4-25492, JP-B 1-38680, JP-B 6-26028, German Patent No. 350399, and the *Journal of the Japanese Chemical Society* (page 1141 in the October 1992 issue). Preferable examples of the singlet oxygen quencher include compounds represented by the general formula (II):

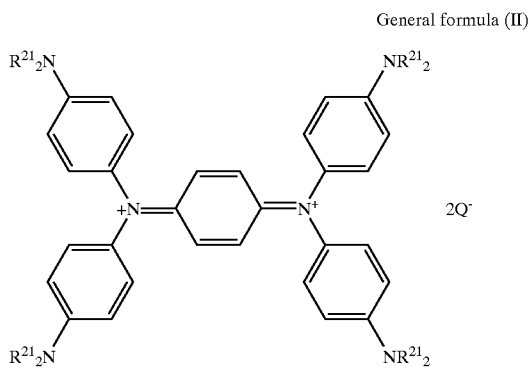

General formula (II)

in which $R^{21}$ represents an alkyl group which may have a substituent, and $Q^-$ represents an anion.

In the general formula (II), $R^{21}$ is generally an optionally substituted $C_{1-8}$ alkyl group, and preferably an unsubstituted $C_{1-6}$ alkyl group. Substituents on the alkyl group include a halogen atom (e.g., F or Cl), an alkoxy group (e.g., methoxy or ethoxy), an alkylthio group (e.g., methylthio or ethylthio), an acyl group (e.g., acetyl or propionyl), an acyloxy group (e.g., acetoxy or propionyloxy), a hydroxyl group, an alkoxycarbonyl group (e.g., methoxycarbonyl or ethoxycarbonyl), an alkenyl group (e.g., vinyl) and an aryl group (e.g., phenyl or naphthyl). Among these, the halogen atom, the alkoxy group, the alkylthio group and the alkoxycarbonyl group are preferable. Preferable examples of the $Q^-$ anion include $ClO_4^-$, $AsF_6^-$, $BF_4^-$ and $SbF_6^-$.

Examples of compounds represented by the general formula (II) are listed in Table 1.

TABLE 1

| Compound No. | $R^{21}$ | $Q^-$ |
|---|---|---|
| II-1 | $CH_3$ | $ClO_4$ |
| II-2 | $C_2H_5$ | $ClO_4$ |
| II-3 | $n-C_3H_7$ | $ClO_4$ |
| II-4 | $n-C_4H_9$ | $ClO_4$ |
| II-5 | $n-C_5H_{11}$ | $ClO_4$ |
| II-6 | $n-C_4H_9$ | $SbF_6^-$ |
| II-7 | $n-C_4H_9$ | $BF_4^-$ |
| II-8 | $n-C_4H_9$ | $AsF_6^-$ |

The amount of the discoloration inhibitor such as a singlet oxygen quencher is usually in the range of 0.1 to 50% by weight, preferably in the range of 0.5 to 45% by weight, more preferably in the range of 3 to 40% by weight and particularly preferably in the range of 5 to 25% by weight, relative to the amount of dye.

For the purpose of improving reflectance during reproduction of information, the recording layer is preferably provided with a light-reflective layer thereon. A light-reflective material to be a material of the light-reflective layer is a material showing high reflectance of lasers, and examples thereof include metals such as Mg, Se, Y, Ti, Zr, Hf, V, Nb, Ta, Cr, Mo, W, Mn, Re, Fe, Co, Ni, Ru, Rh, Pd, Ir, Pt, Cu, Ag, Au, Zn, Cd, Al, Ga, In, Si, Ge, Te, Pb, Po, Sn and Bi, semimetals thereof, and stainless steel. These materials may be used singly or may be combined for use as an alloy. Of these materials, Cr, Ni, Pt, Cu, Ag, Au, Al and stainless steel are preferable. Au metal, Ag metal, Al metal and alloys thereof are particularly preferable, and Ag metal, Al metal or an alloy thereof is most preferable. The light-reflective layer can be formed on the substrate or the recording layer by, for example, depositing, sputtering or ion-plating the above light-reflective material. The thickness of the light-reflective layer is generally in the range of 10 to 300 nm, and preferably in the range of 50 to 200 nm.

For the purpose of physically and chemically protecting the recording layer and the like, the light-reflective layer or the recording layer is preferably provided with a protective layer thereon. If the optical information recording medium has the same structure as a DVD-R type medium, that is, a structure in which two substrates are laminated with the recording layer arranged therebetween, it may not be necessary to provide the medium with a protective layer. A material used in the protective layer includes, for example, an inorganic material such as SiO, $SiO_2$, $MgF_2$, $SnO_2$, $Si_3N_4$ or the like, or an organic materials such as a thermoplastic resin, thermosetting resin, UV curing resin or the like. For example, a film obtained by extrusion of a plastic may be laminated onto the reflective layer via an adhesive to form the protective layer. Alternatively, the protective layer may be formed by a method such as vacuum deposition, sputtering or coating. If a thermoplastic or thermosetting resin is used, the resin may be dissolved in a suitable solvent to prepare a coating solution which is then applied and dried to form the protective layer. If a UV curing resin is used, the resin may be applied directly or a coating solution thereof dissolved in a suitable solvent may be applied and dried, and then cured by irradiation with UV rays to form the protective layer. Depending on objectives, various additives such as antistatic agents, antioxidants, UV absorbers and the like may be added to these coating solutions. The thickness of the protective layer is generally in the range of 0.1 μm to 1 mm. By the process described above, it is possible to produce a laminate consisting of the recording layer, the light-reflective layer and the protective layer arranged on the substrate or a laminate consisting of the light-reflective layer, the recording layer and the protective layer arranged on the substrate.

Using the optical information recording medium described above, the information recording method of the present invention is conducted, for example, as follows. First, while the optical information recording medium is rotated at a constant linear velocity (1.2 to 1.4 m/sec. in the case of CD format) or at a constant angular velocity, the recording medium is irradiated from the substrate side or the protective layer side with recording rays such as rays from a semiconductor laser. It is thought that, when irradiated with these rays, the recording layer absorbs the rays to increase temperature locally, thus undergoing a physical or chemical change (e.g., formation of pits) and changing the optical characteristics at that portion to thereby record information. In the present invention, a semiconductor laser having an oscillation wavelength in the range of 390 to 550 nm is used as the recording ray.

Preferable light sources include a bluish-purple semiconductor laser having an oscillation wavelength in the range of 390 to 415 nm, a bluish-green semiconductor laser with a central oscillation wavelength of 515 nm, and a bluish-purple SHG laser with a central oscillation wavelength of 425 nm, which includes an infrared semiconductor laser with a central oscillation wavelength of 850 nm and a photoconductive wave-guide type wavelength conversion element (SHG). Among these, the bluish purple semiconductor laser or the SHG laser is particularly preferably used. The information recorded in the manner described above can be reproduced by irradiating the substrate of the optical information recording medium with laser rays, during rotation at the same predetermined linear velocity, and detecting reflected rays.

The optical information recording medium of the present invention, similarly to a conventional DVD-R, can be structured such that two laminates, each consisting of a recording layer and a light recording layer arranged on a transparent disk-shaped substrate having a pre-groove formed thereon with a predetermined track pitch, are laminated with the recording layers on the inside. Further, the medium can be structured such that the above-described laminate and a disk-shaped protective substrate of the same shape as the laminate are laminated with the recording layer on the inside. To produce this laminated structure, for example, a transparent substrate having a diameter of 120±3 mm and a thickness of 0.6±0.1 mm is used, and the light information recording medium after lamination is controlled to have a thickness of 1.2±0.2 mm. A UV curing resin used in formation of the protective layer or a synthetic adhesive may be used for this lamination. Also, a double-coated tape can be used for lamination.

Further, the optical information recording medium of the present invention can be structured such that, for example, a light-reflective layer, a recording layer and a thin-film protective layer are arranged in this order on a disk-shaped substrate having a pre-groove formed thereon with a predetermined track pitch. This optical information recording medium is provided with the thin-film protective layer at a side opposite to the substrate side, and the substrate has a predetermined thickness (1.2 mm for CD-R). For recording, this medium is irradiated with rays from the thin-film protective layer side, whereby beam diameter of the irradiation laser rays can be minimized to achieve high-density recording by short-wavelength rays having wavelengths of 450 nm or less.

Preferably, the thin-film protective layer described above has a thickness from 0.1 to 300 $\mu$m and is formed of a photo-setting resin or film-form resin. The thin-film protective layer may be arranged on the recording layer via an intermediate layer, an adhesive layer or the like. The intermediate layer is provided for improving storage stability of the recording layer and improving adhesion between the recording layer and the thin-film protective layer. Examples of materials used in the intermediate layer include inorganic materials such as SiO, $SiO_2$, $MgF_2$, $SnO_2$ and $Si_3N_4$. The intermediate layer can be formed by vacuum film formation, such as deposition or sputtering. The adhesive layer preferably uses an adhesive containing a photo-setting resin. For example, a photo-setting resin or a coating solution thereof in a suitable solvent is applied onto the intermediate layer, then a resin film obtained by extrusion of a plastic is laminated onto the resulting coating, and the resin film thus laminated is irradiated with rays to cure the coating, whereby the resin film can be stuck on the intermediate layer. Thus, the thin-film protective layer is formed.

EXAMPLES

Below, the present invention is described in more detail by reference to Examples, which are not intended to limit the present invention.

Example 1

Exemplified compound (1) was dissolved in methyl cyclohexane to give a recording layer-forming coating solution (concentration: 1 weight %). A recording layer (thickness at pre-groove: about 80 nm) was formed by applying this coating solution by spin coating onto the surface of a polycarbonate substrate (diameter, 120 mm; thickness, 0.6 mm) on which a spiral pre-groove (track pitch, 0.35 $\mu$m; groove width, 0.2 $\mu$m; groove depth, 0.045 $\mu$m) had been formed by extrusion molding. Then, silver was sputtered onto the recording layer to form a light-reflective layer of about 100 nm thickness thereon. Further, a UV curing resin (SD318, produced by Dainippon Ink and Chemicals, Inc.) was applied onto the light-reflective layer and cured by irradiation with UV rays to form a protective layer of 7 $\mu$m in thickness thereon. By the process described above, an optical disk according to the present invention was obtained.

Examples 2 to 9

Optical disks according to the present invention were produced in the same manner as in Example 1 except that the exemplified compounds listed in Table 2 were used in place of the exemplified compound (1) (the amount of compound was not changed).

Comparative Examples 1 to 5

Comparative optical disks were produced in the same manner as in, Example 1 except that comparative coloring compounds A to E, shown below, were used in place of the exemplified compound (1) (the amount of compound was not changed) and 2,2,3,3-tetrafluoropropanol was used as the coating solvent instead of methyl cyclohexane.

Comparative Compounds (A) Compound described in Example 1 in JP-A-4-74690

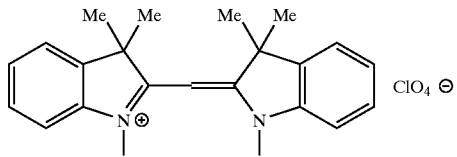

(B) Compound (III) described in Example 1 in JP-A 11-334205

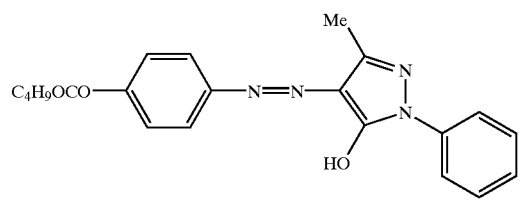

(C) Compound (50) described in Example 9 in JP-A 2000-43423

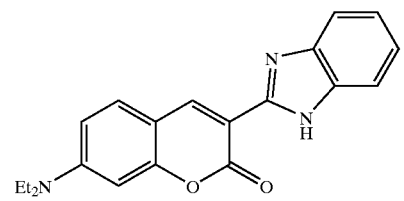

(D) Concrete Example 1-1 described in JP-A 2000-149320

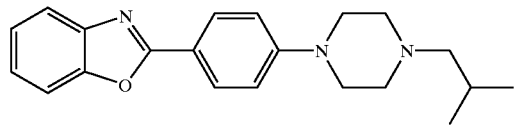

-continued (E) Concrete Example (18) described in JP-A 2000-163799

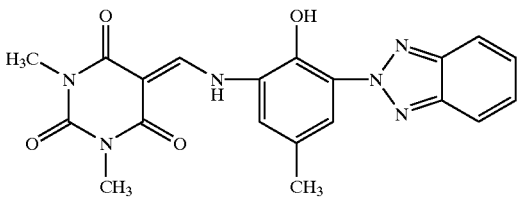

Evaluation of the Optical Disks

The thus prepared optical disks were recorded with a 14T-EFM signal at a linear velocity of 3.5 m/sec., using a bluish-purple semiconductor laser with an oscillation wavelength of 405 nm, and then the recorded signal was replayed. Modulation degree, groove reflectance and sensitivity were measured at optimum power. The recording and recording characteristics were evaluated using "DDU1000", manufactured by Pulstec Co., Ltd. Evaluation results are shown in Table 2.

TABLE 2

|  | Coloring compound in the recording layer | Reflectance at unrecorded portion (%) | Degree of modulation (%) | Sensitivity (mW) |
|---|---|---|---|---|
| Example 1 | (1) | 70 | 62 | 7.2 |
| Example 2 | (3) | 68 | 59 | 7.3 |
| Example 3 | (6) | 69 | 60 | 6.9 |
| Example 4 | (15) | 73 | 65 | 6.5 |
| Example 5 | (16) | 72 | 66 | 6.6 |
| Example 6 | (17) | 73 | 64 | 6.5 |
| Example 7 | (22) | 71 | 66 | 6.4 |
| Example 8 | (28) | 67 | 58 | 7.5 |
| Example 9 | (35) | 75 | 69 | 6.1 |
| Comparative Example 1 | (A) | 35 | 58 | 7.9 |
| Comparative Example 2 | (B) | 36 | 41 | 9.7 |
| Comparative Example 3 | (C) | 61 | 54 | 8.3 |
| Comparative Example 4 | (D) | 55 | 56 | 8.8 |
| Comparative Example 5 | (E) | Not measurable due to whitening of the recording layer | | |

As can be seen from the results in Table 2, the optical disks of the present invention containing the 1,2,3-triazole compound as the recording material in the recording layer (Examples 1 to 9), when compared with the optical disks containing Comparative Compounds A to D as the recording material in the recording layer (Comparative Examples 1 to 4), exhibited high reflectance, gave high degrees of modulation and had high sensitivity when irradiated with a laser ray having a short wavelength of 405 nm (a bluish-purple laser ray). Accordingly, it can be understood that the optical information recording medium according to the present invention is capable of recording and regenerating information by irradiation with a laser ray having a short wavelength of 405 nm, and has excellent recording characteristics with respect to a laser ray with a short wavelength of 405 nm. Further, the optical disk containing Comparative Compound E, which had a group derived from 1,3-dimethylbarbituric acid, in the recording layer could not be used for recording because of whitening of the recording layer, whereas the optical disks of the present invention, which used the 1,2,3-triazole compounds, could form transparent, stable recording layers.

The optical information recording medium of the present invention demonstrates the effects of being capable of recording and reproduction by irradiation with laser rays having wavelengths of 550 nm or less, particularly laser rays having wavelengths of 450 nm or less, which are shorter wavelengths than those of laser rays used in recording and reproduction of CD-R and DVD-R, and has excellent recording characteristics with respect to exhibiting high reflectance for such laser rays and providing a high degree of modulation and high sensitivity.

By use of the optical information recording medium of the present invention, the information recording method of the present invention demonstrates the effects of being capable of high-density recording of information and of recording large amounts of information by irradiation with laser rays having wavelengths of 550 nm or less, particularly laser rays having wavelengths of 450 nm or less, which are shorter wavelengths than those of laser rays used in recording and reproduction of CD-R and DVD-R.

What is claimed is:

1. An optical information recording medium comprising:

a substrate; and a recording layer on the substrate which is capable of recording information by irradiation with laser rays, the recording layer comprising a 1,2,3-triazole compound devoid of a condensate with 1,3-dimethylbarbituric acid, wherein the 1,2,3-triazole compound is represented by the following general formula I:

General formula (I)

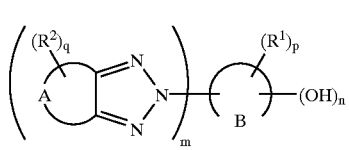

in which: A and B represent aromatic rings which may have substituents; m and n each independently represents an integer from 1 to 3; $R^1$ and $R^2$ represent substituents, and the substituent represented by $R^1$ is not derived from 1,3-dimethylbarbituric acid; and p and q represent integers from 0 to 3.

2. An optical information recording medium according to claim 1, wherein the 1,2,3-triazole compound is represented by the following general formula I:

General formula (I)

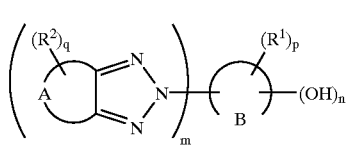

in which: A and B represent aromatic rings which may have substituents; m and n each independently represents an integer from 1 to 3; $R^1$ represents a substituent on the aromatic ring B and $R^2$ represents a substituent on the aromatic ring A; p and q represent integers from 0 to 3; and, if m=1 and p≠0, $R^1$ represents a substituent selected from the group consisting of a $C_{2-16}$ alkyl group, a $C_{6-14}$ aryl group, a $C_{7-15}$ aralkyl group, a $C_{1-16}$ alkoxy group, a $C_{6-14}$ aryloxy group, a $C_{2-17}$ alkoxycarbonyl group, a $C_{1-10}$ carbamoyl group, a $C_{1-10}$ amide group, a $C_{2-17}$ acyloxy group, a $C_{2-20}$ acyl group, and a halogen atom.

3. An optical information recording medium according to claim 1, wherein the 1,2,3-triazole compound is represented by the following general formula I-A:

General formula (I-A)

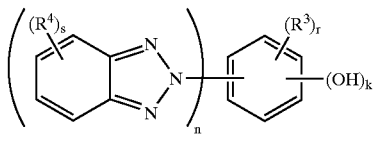

in which: h and k each independently represents an integer from 1 to 3; $R^3$ and $R^4$ represent substituents; r and s represent integers from 0 to 3; and, if h=1 and r≠0, $R^3$ represents a substituent selected from the group consisting of a $C_{2-16}$ alkyl group, a $C_{2-14}$ aryl group, a $C_{7-15}$ aralkyl group, a $C_{1-16}$ alkoxy group, a $C_{6-14}$ aryloxy group, a $C_{2-17}$ alkoxycarbonyl group, a $C_{1-10}$ carbamoyl group, a $C_{1-10}$ amide group, a $C_{2-17}$ acyloxy group, a $C_{2-20}$ acyl group, and a halogen atom.

4. An optical information recording medium according to claim 1, wherein the 1,2,3-triazole compound is represented by the following general formula I-B:

General formula (I-B)

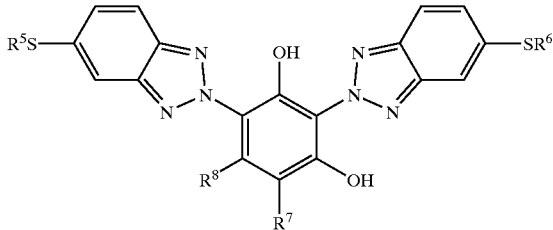

in which: $R^5$ and $R^6$ each independently represents a substituent selected from a group consisting of a $C_{1-20}$ linear or cyclic alkyl group, a $C_{6-18}$ aryl group, a $C_{7-19}$ aralkyl group, and a 5- or 6-membered heterocyclic group; $R^7$ represents a substituent selected from a group consisting of a hydrogen atom, a halogen atom, a $C_{1-20}$ linear or cyclic alkyl group, a $C_{6-18}$ aryl group, a $C_{7-19}$ aralkyl group, a $C_{2-20}$ acyl group, a $C_{1-20}$ alkoxy group, a $C_{2-20}$ alkoxycarbonyl group, and a $C_{7-19}$ carbamoyl group; $R^8$ represents a substituent selected from a group consisting of a hydrogen atom, a halogen atom, a hydroxyl group, a $C_{1-20}$ alkoxy group, and a $C_{2-20}$ acyloxy group; and each substituent represented by $R^7$ and $R^8$ may be linked together to form a ring.

5. An optical information recording medium according to claim 1, wherein the substrate is a transparent disk-shaped substrate having a pre-groove formed at at least one surface thereof with a track pitch of 0.2 to 0.8 μm, and the recording layer is provided on the surface of the substrate at which the pre-groove is formed.

6. An optical information recording medium according to claim 1, further comprising at least one of a light-reflective layer formed of a metal and a protective layer.

7. An information recording method comprising the steps of:
providing an optical information recording medium comprising, on a substrate, a recording layer capable of recording information by irradiation with laser rays, the recording layer comprising a 1,2,3-triazole compound devoid of a condensate with 1,3-dimethylbarbituric acid; and
irradiating the optical information recording medium with a laser having a wavelength of at most 550 nm for recording information;
wherein the 1,2,3-triazole compound is represented by the following general formula I:

General formula (I)

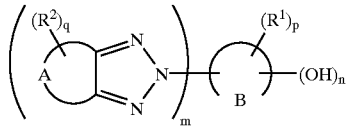

in which: A and B represent aromatic rings which may have substituents; m and n each independently represents an integer from 1 to 3; $R^1$ and $R^2$ represent substituents, and the substituent represented by $R^1$ is not derived from 1,3-dimethylbarbituric acid; and p and q represent integers from 0 to 3.

8. An information recording method according to claim 7, wherein the 1,2,3-triazole compound is represented by the following general formula I:

General formula (I)

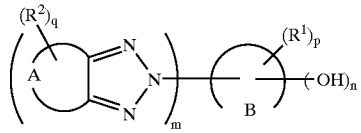

in which: A and B represent aromatic rings which may have substituents; m and n each independently represents an integer from 1 to 3; $R^1$ represents a substituent on the aromatic ring B and $R^2$ represents a substituent on the aromatic ring A; p and q represent integers from 0 to 3; and, if m=1 and p≠0, $R^1$ represents a substituent selected from the group consisting of a $C_{2-16}$ alkyl group, a $C_{6-14}$ aryl group, a $C_{7-15}$ aralkyl group, a $C_{1-16}$ alkoxy group, a $C_{6-14}$ aryloxy group, a $C_{2-17}$ alkoxycarbonyl group, a $C_{1-10}$ carbamoyl group, a $C_{1-10}$ amide group, a $C_{2-17}$ acyloxy group, a $C_{2-20}$ acyl group, and a halogen atom.

9. An information recording method according to claim 7, wherein the 1,2,3-triazole compound is represented by the following general formula I-A:

General formula (I-A)

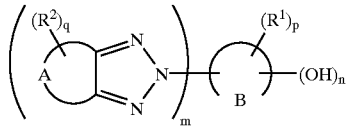

in which: h and k each independently represents an integer from 1 to 3; $R^3$ and $R^4$ represent substituents; r and s represent integers from 0 to 3; and, if h=1 and r≠0, $R^3$ represents a substituent selected from the group consisting of a $C_{2-16}$ alkyl group, a $C_{6-14}$ aryl group, a $C_{7-15}$ aralkyl group, a $C_{1-16}$ alkoxy group, a $C_{6-14}$ aryloxy group, a $C_{2-17}$ alkoxycarbonyl group, a $C_{1-10}$ carbamoyl group, a $C_{1-10}$ amide group, a $C_{2-17}$ acyloxy group, a $C_{2-20}$ acyl group, and a halogen atom.

10. An information recording method according to claim 7, wherein the 1,2,3-triazole compound is represented by the following general formula I-B:

General formula (I-B)

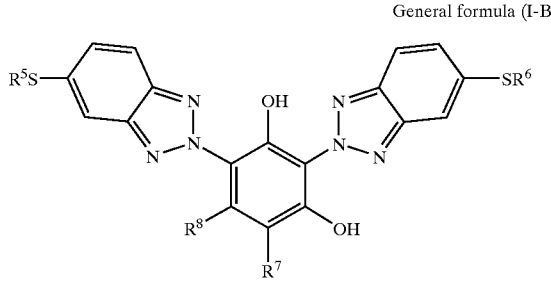

in which: $R^4$ and $R^6$ each independently represents a substituent selected from a group consisting of a $C_{1-20}$ linear or cyclic alkyl group, a $C_{6-18}$ aryl group, a $C_{7-19}$ aralkyl group, and a 5- or 6-membered heterocyclic group; $R^7$ represents a substituent selected from a group consisting of a hydrogen atom, a halogen atom, a $C_{1-20}$ linear or cyclic alkyl group, a $C_{6-18}$ aryl group, a $C_{7-19}$ aralkyl group, a $C_{2-20}$ acyl group, a $C_{1-20}$ alkoxy group, a $C_{2-20}$ alkoxycarbonyl group, and a $C_{1-17}$ carbamoyl group; $R^8$ represents a substituent selected from a group consisting of a hydrogen atom, a halogen atom, a hydroxyl group, a $C_{1-20}$ alkoxy group, and a $C_{2-20}$ acyloxy group; and each substituent represented by $R^7$ and $R^8$ may be linked together to form a ring.

11. An information recording method according to claim 7, wherein the substrate of the optical information recording medium is a transparent disk-shaped substrate having a pre-groove formed at at least one surface thereof with a track pitch of 0.2 to 0.8 μm, and the recording layer is provided on the surface of the substrate at which the pre-groove is formed.

12. An information recording method according to claim 7, wherein the optical information recording medium further includes at least one of a light-reflective layer formed of a metal and a protective layer.

13. An information recording method according to claim 7 comprising:
irradiating the optical information recording medium with a laser having a wavelength of at most 450 nm for recording information.

14. An information recording medium according to claim 1, wherein said recording layer further comprises a second coloring compound.

15. An information recording medium according to claim 14, wherein said second coloring compound is selected from the group consisting of cyanine dyes, oxonol dyes, azo metal complexes, phthalocyanine dyes, pyrylium dyes, thiopyrylium dyes, azulenium dyes, squarylium dyes, naphthoquinone dyes, triphenyl methane dyes, and triaryl methane dyes.

16. An information recording medium according to claim 1, wherein a surface of the substrate on which the recording layer is arranged comprises an undercoat layer.

17. An information recording medium according to claim 16, wherein undercoat layer improves flatness, improves adhesion, and prevents deterioration of the recording layer.

18. An information recording medium according to claim 16, wherein said undercoat layer comprises a material selectred from the group consisting of:
polymethyl methacrylate, acrylic acid-methacrylic acid copolymers, styrene-maleic anhydride copolymers, polyvinyl alcohols, N-methylol acrylamide, styrene-vinyl toluene copolymers, chlorosulfonated polyethylene, nitrocellulose, polyvinyl chloride, chlorinated polyolefin, polyester, polyimide, vinyl acetate-vinyl chloride copolymers, ethylene-vinyl acetate copolymers, polyethylene, polypropylene, polycarbonate, and silane coupling agents.

* * * * *